(12) United States Patent
Tezuka et al.

(10) Patent No.: US 8,587,924 B2
(45) Date of Patent: Nov. 19, 2013

(54) MULTILAYER CAPACITOR, MANUFACTURING METHOD THEREOF, CIRCUIT BOARD, AND ELECTRONIC DEVICE

(75) Inventors: Takenori Tezuka, Nagano (JP); Chiharu Ito, Nagano (JP); Tomonao Kako, Nagano (JP)

(73) Assignee: Rubycon Corporation (JP)

( * ) Notice: Subject to any disclaimer, the term of this patent is extended or adjusted under 35 U.S.C. 154(b) by 0 days.

(21) Appl. No.: 13/501,357

(22) PCT Filed: Oct. 13, 2010

(86) PCT No.: PCT/JP2010/067924
§ 371 (c)(1),
(2), (4) Date: Apr. 27, 2012

(87) PCT Pub. No.: WO2011/046132
PCT Pub. Date: Apr. 21, 2011

(65) Prior Publication Data
US 2013/0050895 A1 Feb. 28, 2013

(30) Foreign Application Priority Data
Oct. 16, 2009 (JP) ................. 2009-239159

(51) Int. Cl.
*H01G 4/228* (2006.01)

(52) U.S. Cl.
USPC .......... 361/306.3; 361/321.1; 361/321.2; 361/306.1; 361/301.4; 361/305

(58) Field of Classification Search
USPC ............ 361/306.3, 306.1, 301.2, 301.4, 361/303–305, 311–313, 321.1, 321.2
See application file for complete search history.

(56) References Cited

U.S. PATENT DOCUMENTS

| | | | | |
|---|---|---|---|---|
| 6,459,561 | B1 * | 10/2002 | Galvagni et al. | 361/306.3 |
| 6,876,537 | B2 * | 4/2005 | Takahara et al. | 361/321.2 |
| 7,035,079 | B1 * | 4/2006 | Park et al. | 361/303 |

(Continued)

FOREIGN PATENT DOCUMENTS

| | | |
|---|---|---|
| JP | 3-255605 A | 11/1991 |
| JP | 2002198257 A | 7/2002 |

(Continued)

OTHER PUBLICATIONS

International Search Report for International Application No. PCT/JP2010/067924, dated Dec. 14, 2010, with English translation.
TW Office Action for Application No. TW099135228 (claiming priority to JP2009-239159); Date of Mailing: Jul. 8, 2013; 9 pgs. w/English Translation.

*Primary Examiner* — Nguyen T Ha
(74) *Attorney, Agent, or Firm* — Cantor Colburn LLP

(57) ABSTRACT

Provided is a multilayer capacitor that can be manufactured with high yields and whose warpage is suppressed. The multilayer capacitor includes two or more laminated bodies which are bonded together, the two or more laminated bodies each including resin layers and metal layers which are alternately laminated a plurality of times in a thickness direction and each being warped and having front and rear surfaces covered with surface layers containing a resin material, one of the front and rear surfaces being formed of a first surface as a smooth surface having no recess portion, another of the front and rear surfaces being formed of a second surface having a recess portion, in which at least two adjacent laminated bodies are bonded together at the first surfaces or the second surfaces. Also provided are a manufacturing method for the multilayer capacitor, and a circuit board and an electronic device which use the multilayer capacitor.

7 Claims, 5 Drawing Sheets

(56) References Cited

U.S. PATENT DOCUMENTS

| | | | |
|---|---|---|---|
| 7,542,264 B2 * | 6/2009 | Oshima | 361/306.3 |
| 7,969,709 B2 * | 6/2011 | Sakaguchi et al. | 361/311 |
| 8,125,765 B2 * | 2/2012 | Ishida et al. | 361/321.2 |
| 2013/0050895 A1 | 2/2013 | Tezuka et al. | |

FOREIGN PATENT DOCUMENTS

| | | |
|---|---|---|
| JP | 2003-264119 A | 9/2003 |
| JP | 2006-245175 A | 9/2006 |
| JP | 2008-21681 A | 1/2008 |

\* cited by examiner

MULTILAYER CAPACITOR, MANUFACTURING METHOD THEREOF, CIRCUIT BOARD, AND ELECTRONIC DEVICE

CROSS REFERENCE TO RELATED APPLICATIONS

This is a U.S. national stage of application No. PCT/JP2010/067924, filed on Oct. 13, 2010. Priority under 35 U.S.C. §119(a) and 35 U.S.C. §365(b) is claimed from Japanese Application No. 2009-239159, filed 16 Oct. 2009, the disclosure of which are also incorporated herein by reference.

TECHNICAL FIELD

The present invention relates to a multilayer capacitor, a manufacturing method therefor, a circuit board, and an electronic device.

BACKGROUND ART

Known examples of a multilayer capacitor in which thin film metal layers and thin film resin layers are alternately laminated include a multilayer capacitor which is of such type that is manufactured through steps such as laminating and winding a pair of metallized plastic films having a deposited metal film formed thereon around a large diameter winding core (see Patent Literature 1) and a multilayer capacitor which is of such type that is manufactured through steps such as depositing and laminating metal layers and resin layers alternately on a drum rotating in one direction (see Patent Literatures 2 and 3). In Patent Literatures 1 to 3, it is also proposed to manufacture a multilayer capacitor through the step of closely adhering laminated bodies in which the metal layers and the resin layers are laminated together to be integrated or the step of stacking the laminated bodies.

CITATION LIST

Patent Literature

PTL 1: JP 03-255605 A (Claims 1 and 2, etc.)
PTL 2: JP 2006-245175 A (Claims 1, 12, and 13, etc.)
PTL 3: JP 2008-21681 A (Claims 1 and 8, etc.)

SUMMARY OF INVENTION

Technical Problems

A multilayer capacitor formed by stacking and bonding two or more such laminated bodies together (hereinafter, sometimes referred to as "bonded type multilayer capacitor") can obtain substantially the same capacitance as that of a multilayer capacitor which uses a single laminated body having the same total thickness as that of the bonded type multilayer capacitor (hereinafter, sometimes abbreviated as "single type multilayer capacitor").

Meanwhile, in the manufacture of a laminated body for a large capacitance single type multilayer capacitor by the method disclosed in Patent Literature 1, it is necessary to increase the number of windings of the metallized plastic films in proportion to the increase in capacitance, namely the increase in thickness. The increased number of windings, however, easily leads to the increase in foreign matters and defects between the metalized plastic films. In the manufacture of a laminated body for a large capacitance single type multilayer capacitor by the deposition method disclosed in Patent Literatures 2 and 3, a longer film formation period is necessary to manufacture the laminated body, and hence the breakdown voltage and the capacitance easily fluctuate and the number of foreign matter defects during the film formation increases. Such methods are therefore more apt to reduce yields in the manufacture of a large capacitance single type multilayer capacitor. In those respects, the bonded type multilayer capacitor is more advantageous in securing the yields than the single type multilayer capacitor as the capacitance increases, provided that the capacitance is the same.

As described above, the laminated bodies constituting the bonded type multilayer capacitor are formed on a columnar member such as a core or a drum. Accordingly, the laminated bodies immediately after being formed on the columnar member are warped. In order to reduce the warpage, the technologies disclosed in Patent Literatures 1 to 3 also propose to bond the laminated bodies after being subjected to flattening by hot pressing. However, it is difficult even for such flattening to completely remove the warpage of the laminated bodies. It is therefore difficult to avoid the occurrence of warpage in a bonded type multilayer capacitor using the flattened laminated bodies. In addition, if long-term flattening is performed for completely reducing the warpage of the laminated bodies, the productivity is lowered.

The present invention has been made in view of the above-mentioned circumstances, and it is an object thereof to provide a multilayer capacitor which can be manufactured at high yields and whose warpage is suppressed, a manufacturing method thereof, and a circuit board and an electronic device which use the multilayer capacitor.

Solution to Problems

The above-mentioned object is attained by the present invention as follows.

Specifically, according to the present invention, there is provided a multilayer capacitor, including two or more laminated bodies which are bonded together, the two or more laminated bodies each including resin layers and metal layers which are alternately laminated a plurality of times in a thickness direction by alternately repeating at least a step of depositing a resin raw material on a support body and a step of depositing a metal raw material on the support body, one of two adjacent metal layers sandwiching at least one of the resin layers in the thickness direction functioning as a positive electrode, another of the two adjacent metal layers functioning as a negative electrode, the two or more laminated bodies each being warped and having front and rear surfaces covered with surface layers containing a resin material, one of the front and rear surfaces being formed of a first surface as a smooth surface having no recess portion, another of the front and rear surfaces being formed of a second surface having a recess portion, in which at least two adjacent laminated bodies are bonded together at the first surfaces or the second surfaces.

In an embodiment of the multilayer capacitor according to the present invention, it is preferred that the multilayer capacitor have a thickness in a range of from 2 mm to 10 mm.

In another embodiment of the multilayer capacitor according to the present invention, it is preferred that two surface layers positioned on both sides of a bonding interface at which the two adjacent laminated bodies are bonded together at the first surfaces or the second surfaces have a total thickness in a range of 2 to 100 times a thickness of each of the resin layers.

In still another embodiment of the multilayer capacitor according to the present invention, it is preferred that: both end surfaces of the laminated bodies in which two or more laminated bodies are bonded and laminated together be each covered with a metal material functioning as an external electrode; and the metal material be present also at bonding interface between the laminated bodies in a vicinity of the both end surfaces.

According to the present invention, there is also provided a method of manufacturing a multilayer capacitor, including: forming a laminated body in which a first surface layer, a capacitor layer, and a second surface layer are laminated in the stated order, the forming a laminated body including at least: a first surface layer forming step of forming, by a vapor phase film formation method, the first surface layer made of a resin material on an outer circumferential surface of a columnar member rotating in one direction; a capacitor layer forming step of forming, on the first surface layer, the capacitor layer which has a structure in which metal layers and resin layers are alternately laminated a plurality of times and functions as a multilayer capacitor, the capacitor layer forming step including: after the first surface layer forming step is finished, repeatedly and sequentially performing in this order a plurality of times: (1) a first formation step of forming, by a vapor phase film formation method, a metal layer which is patterned and actually functions as an electrode of any one of a positive polarity and a negative polarity; (2) a second formation step of forming, by a vapor phase film formation method, a resin layer on the metal layer formed in the first formation step; (3) a third formation step of forming, by a vapor phase film formation method, a metal layer which is patterned and actually functions as an electrode of an opposite polarity to the one of the positive polarity and the negative polarity; and (4) a fourth formation step of forming, by a vapor phase film formation method, a resin layer on the metal layer formed in the third formation step; and performing the first formation step or the third formation step as a final formation step for terminating the repetition from the first formation step to the fourth formation step; and a second surface layer forming step of forming, by a vapor phase film formation method, the second surface layer made of a resin material on the metal layer formed lastly in the forming the capacitor layer; and at least a bonding step of bonding, after the laminated body is released from the outer circumferential surface of the columnar member and is cut into two or more pieces, the cut laminated bodies together at the first surface layers or the second surface layers.

A circuit board according to the present invention includes the multilayer capacitor according to the present invention.

An electronic device according to the present invention includes the multilayer capacitor according to the present invention.

Advantageous Effects of Invention

According to the present invention, there may be provided a multilayer capacitor which can be manufactured at high yields and whose warpage is suppressed, a manufacturing method thereof, and a circuit board and an electronic device which use the multilayer capacitor.

DESCRIPTION OF EMBODIMENTS

Figure 1:
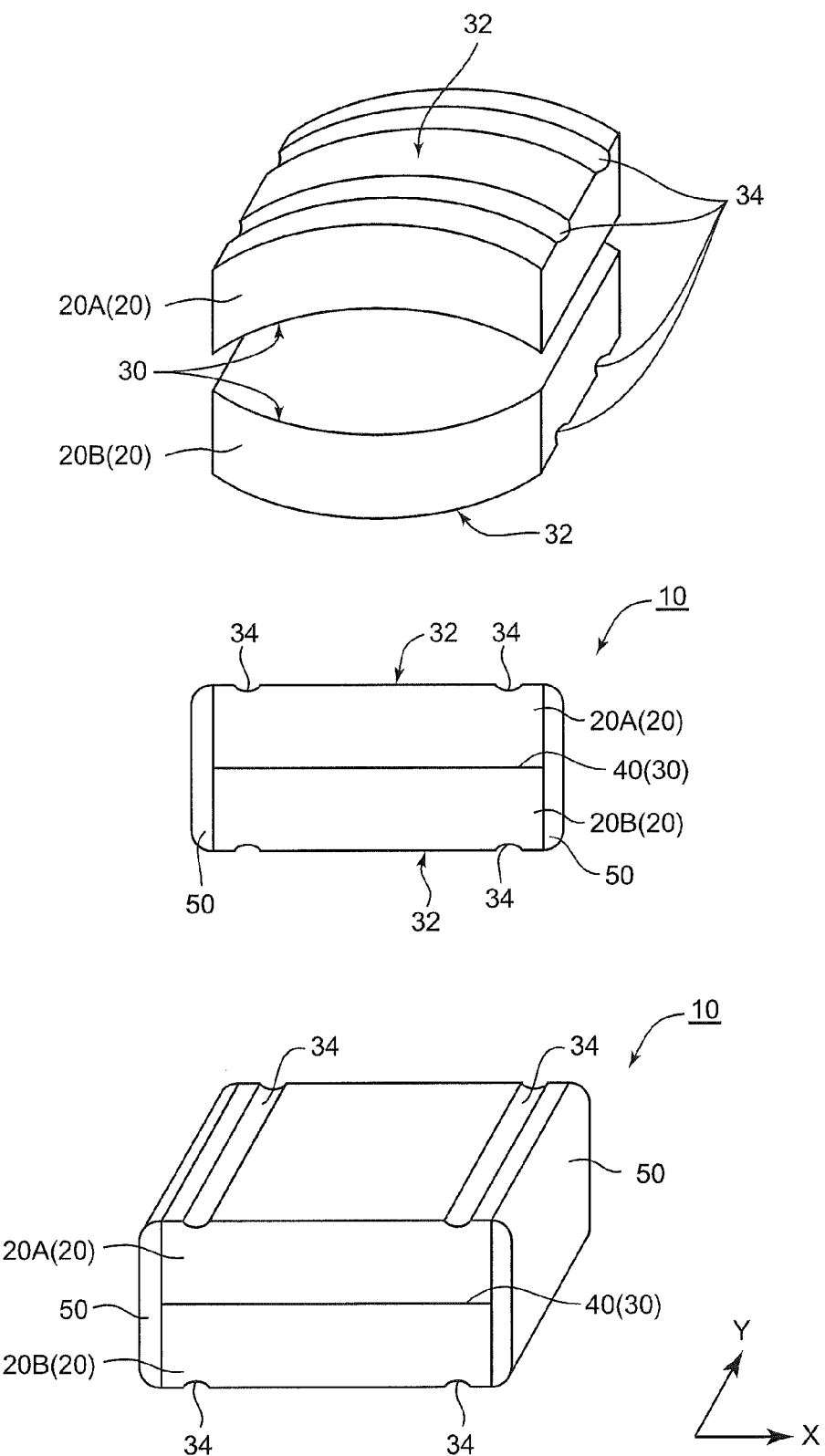
FIG. 1 A schematic cross-sectional view illustrating an example of a multilayer capacitor according to an embodiment of the present invention.

A multilayer capacitor according to an embodiment of the present invention includes two or more laminated bodies which are bonded together, the two or more laminated bodies each including resin layers and metal layers which are alternately laminated a plurality of times in a thickness direction by alternately repeating at least a step of depositing a resin raw material on a support body and a step of depositing a metal raw material on the support body, one of two adjacent metal layers sandwiching at least one of the resin layers in the thickness direction functioning as a positive electrode, another of the two adjacent metal layers functioning as a negative electrode, the two or more laminated bodies each being warped and having front and rear surfaces covered with surface layers containing a resin material, one of the front and rear surfaces being formed of a first surface as a smooth surface having no recess portion, another of the front and rear surfaces being formed of a second surface having a recess portion, in which at least two adjacent laminated bodies are bonded together at the first surfaces or the second surfaces.

As described above, the multilayer capacitor of this embodiment is a bonded type multilayer capacitor in which two or more laminated bodies are bonded together. Accordingly, the multilayer capacitor of this embodiment can be manufactured at higher yields than a single type multilayer capacitor which uses a single laminated body having the same total thickness as that of the multilayer capacitor of this embodiment.

The laminated body constituting the multilayer capacitor according to this embodiment includes resin layers and metal layers which are alternately laminated a plurality of times in a thickness direction by alternately repeating at least a step of depositing a resin raw material on a support body and a step of depositing a metal raw material on the support body, one of two adjacent metal layers sandwiching at least one of the resin layers in the thickness direction functioning as a positive electrode, another of the two adjacent metal layers functioning as a negative electrode, the laminated body being warped and having front and rear surfaces covered with surface layers containing a resin material, one of the front and rear surfaces being formed of a first surface as a smooth surface having no recess portion, another of the front and rear surfaces being formed of a second surface having a recess portion.

The laminated body is warped. In the formation of the laminated body, the surface having been in contact with the support body constitutes a smooth surface without any recess portion (first surface). In addition, in order that one of two adjacent metal layers sandwiching at least one of the resin layers in the thickness direction may function as a positive electrode and the other may function as a negative electrode, the metal layers have a predetermined pattern so that missing portions are partially present, instead of being formed as a film whose entire surface in the planar direction is solid. Accordingly, the missing portions of the metal layers in the planar direction are overlaid in the thickness direction of the laminated body, and hence the recess portions are formed in the surface of the laminated body opposite to the first surface (second surface).

The multilayer capacitor of this embodiment is formed by laminating at least two such laminated bodies together. In this case, any two of adjacent laminated bodies are bonded together at the first surfaces or the second surfaces. In other words, as a result of the occurrence of warpage, if the first surface is a convex surface, the convex surfaces are bonded together, and, if the first surface is a concave surface, the concave surfaces are bonded together. When the surfaces having the same warpage shape are bonded together, a force acts to eliminate a space between the surfaces generated by the warpage, and the warpage is suppressed in the multilayer capacitor as a whole. Accordingly, excellent mountability can be obtained in mounting a multilayer capacitor on a flat board such as the surface of a circuit board.

Note that, a pair of the laminated bodies to be bonded together at the surfaces having the same warpage shape may have different structures and may be manufactured by different processes, as long as the laminated bodies are warped in the same direction with respect to the first surface (or the second surface) and to substantially the same extent. In general, however, the direction of warpage of the laminated body with respect to the first surface (or the second surface) and the extent of warpage are determined by the structure and the manufacturing process of the laminated body. It is therefore particularly preferred to use a pair of laminated bodies having the same structure and manufactured by the same process.

From the viewpoint of suppression of warpage, the number of laminated bodies constituting the multilayer capacitor of this embodiment is particularly preferred to be even. In this case, the laminated bodies are bonded together so that the warpage of the n-th laminated body and the warpage of the (n+1)th laminated body are cancelled. Note that, "n" as used herein means an odd number of 1 or more when the bonded laminated bodies are numbered in order from one surface side to the other surface side of the multilayer capacitor. In the bonding, it is preferred to bond the first surfaces having no recess portion and being smooth rather than to bond the second surfaces having recess portions. The reason is that, if the second surfaces are bonded together, a gap resulting from the recess portions is generated at a bonding interface between two laminated bodies, which is a little inferior in adhesiveness to the bonding at the first surfaces. In light of this, the number of the laminated bodies constituting the multilayer capacitor of this embodiment is particularly preferred to be two, because a multilayer capacitor formed of only the laminated bodies bonded at the first surfaces can be obtained.

The thickness of the multilayer capacitor according to this embodiment is preferably 2 mm or more, more preferably 3 mm or more. A multilayer capacitor having a thickness of 2 mm or more can be realized even with a single type multilayer capacitor. In the manufacture of a laminated body constituting a single type multilayer capacitor, however, it is necessary to laminate a large number of resin layers and a large number of metal layers alternately. In particular, when the thickness is 3 mm or more, the lowering of yields resulting from foreign matters and defects or the like and the occurrence of quality variation such as breakdown voltage and capacitance are apt to be conspicuous. However, the multilayer capacitor of this embodiment uses two or more laminated bodies, and hence, even if the thickness is set to 2 mm or more, the lowering of yields and the occurrence of quality variation can be suppressed. Note that, the upper limit of the thickness is not particularly limited, but is preferably 10 mm or less, more preferably 5 mm or less from the practical viewpoint.

Further, in the multilayer capacitor according to this embodiment, it is preferred that two surface layers positioned on both sides of a bonding interface at which the two adjacent laminated bodies are bonded together at the first surfaces or the second surfaces have a total thickness in a range of 2 to 100 times a thickness of each of the resin layers.

In the multilayer capacitor of this embodiment employing the configuration described above, the capacitance can be increased more. The reason is as follows. First, the front and rear surfaces of the laminated bodies constituting the multilayer capacitor are covered with surface layers containing a resin material. In general, the surface layer is required to function as a protective layer in order to protect a metal layer disposed at the position closest to the front surface side (or the rear surface side) of the laminated body and also protect a resin layer and a metal layer which are provided inside the metal layer from external abrasion and mechanical impact during the work of mounting the multilayer capacitor and in other such situations. In order to ensure the function as a protective layer, the thickness of the surface layer needs to be about 50 to 5,000 times the thickness of the resin layer in general. In the multilayer capacitor of this embodiment, however, the surface layers corresponding to the surfaces at which the laminated bodies are bonded together are not required to function as the above-mentioned protective layers. The reason is that, in the multilayer capacitor of this embodiment, the surface layers corresponding to the surfaces at which the laminated bodies are bonded together are not exposed to a mechanical stress such as abrasion, a physical stress such as heat, and other such stresses during the work of mounting the multilayer capacitor.

Therefore, in the multilayer capacitor of this embodiment manufactured with the use of a laminated body whose both surfaces are each covered with a surface layer functioning as a protective layer, the thickness of the resin material at the bonding interface portion is twice the thickness of the surface layer functioning as the protective layer, that is, about 100 to 10,000 times the thickness of the resin layer. In the thickness direction of the multilayer capacitor, the region of the surface layers does not function as a capacitor, and the capacitance is reduced accordingly. However, if the sum of the thicknesses of two surface layers positioned on both sides of the bonding interface is reduced within the range of from 2 to 100 times the thickness of the resin layer, the region which does not function as a capacitor can be reduced in the thickness direction of the multilayer capacitor. Thus, the capacitance can be increased more in a multilayer capacitor having a configuration in which the sum of the thicknesses of two surface layers positioned on both sides of the bonding interface is set within the range of from 2 to 100 times the thickness of the resin layer, provided that the thickness of the multilayer capacitor is the same.

Note that, the sum of the thicknesses of two surface layers positioned on both sides of the bonding interface is preferably within the range of from 2 to 100 times the thickness of the resin layer as described above, more preferably within the range of from 2 to 50 times, still more preferably within the range of from 2 to 20 times. When the sum of the thicknesses of two surface layers positioned on both sides of the bonding interface is set to twice the thickness of the resin layer or more, in the manufacture of a multilayer capacitor, even if the surface covered with a thinner surface layer in both surfaces of the laminated body is exposed to some kind of physical, mechanical, or chemical stress, the breakage of the internal metal layer and the internal resin layer can be suppressed. In addition, when the sum of the thicknesses of two surface layers positioned on both sides of the bonding interface is set to 100 times or less, the capacitance can be increased more as compared with a multilayer capacitor having the same thickness which uses a laminated body whose both surfaces are each covered with a surface layer functioning as a protective layer.

Further, in the multilayer capacitor according to this embodiment, both end surfaces of the laminated bodies in which two or more laminated bodies are laminated together are each covered with a metal material functioning as an external electrode. In this case, it is preferred that the metal material be present also at the bonding interface between the laminated bodies in the vicinity of both end surfaces of the laminated bodies in the state in which at least two laminated bodies are laminated. In this case, the metal material present at the bonding interface exhibits the anchor effect so that the adhesion strength between the end surface of the laminated body and the external electrode is enhanced more. In particular, in a multilayer capacitor formed by bonding two laminated bodies together at the surfaces warped to be convex, a gap is inevitably easily generated at the bonding interface between the laminated bodies in the vicinity of both end surfaces of the two bonded laminated bodies. In this case, for example, through adjustment of bonding conditions to bond the two laminated bodies, a gap with a desired size is intentionally formed at the bonding interface, and the metal material constituting the external electrode is disposed also in the gap. In this manner, the above-mentioned effect can be obtained easily.

Next, a specific example of the multilayer capacitor according to this embodiment is described with reference to the drawings. FIG. 1 is a schematic cross-sectional view illustrating an example of the multilayer capacitor according to this embodiment, in which the upper section illustrates the state before two laminated bodies are bonded together (the state in production stage), the middle section illustrates the state after the two laminated bodies are bonded together (completed product), and the lower section illustrates a perspective view of the completed product. The lateral side of the figure illustrated in the upper section of FIG. 1 and the front side of the figures illustrated in the middle and lower sections of FIG. 1 have a correspondence relationship. Note that, FIG. 1 omits detailed description of layers such as a resin layer and a metal layer of the individual laminated bodies constituting the multilayer capacitor. In a multilayer capacitor 10 illustrated in the middle section of FIG. 1, two laminated bodies 20A and 20B illustrated in the upper section of FIG. 1, which are warped to substantially the same extent, are bonded together at first surfaces 30 thereof. The detailed structure of the laminated bodies 20A and 20B is described later. Before bonding, the laminated bodies 20 are warped to be concave on the first surface 30 side as illustrated in the upper section of FIG. 1. As illustrated in the middle and lower sections of FIG. 1, the bonding at the first surfaces 30 eliminates a space (gap) which is otherwise generated between the first surfaces 30 and 30 when the two laminated bodies 20A and 20B are simply stacked. Thus, no warpage occurs in the multilayer capacitor 10 as a whole. Second surfaces 32 and 32 of the two laminated bodies 20 constitute the front and rear surfaces of the multilayer capacitor 10, respectively. Recess portions 34 provided in the second surfaces 32 are also positioned in the front and rear surfaces of the multilayer capacitor 10. On the other hand, at a bonding interface 40 between the laminated bodies 20, the first surfaces 30 each having a smooth entire surface are bonded together and therefore in close contact with each other at the entire bonding interface without any gap. Note that, on both end surfaces (lateral end surfaces in FIG. 1) of the multilayer capacitor 10, external electrodes 50 made of a conductive material such as a metal material are provided. The external electrodes 50 are provided to be electrically connectable to metal layers (not shown). Note that, the external electrodes 50 may be provided so as to come into the first surface 30 side a little from the end surface of the multilayer capacitor 10.

Figure 2:
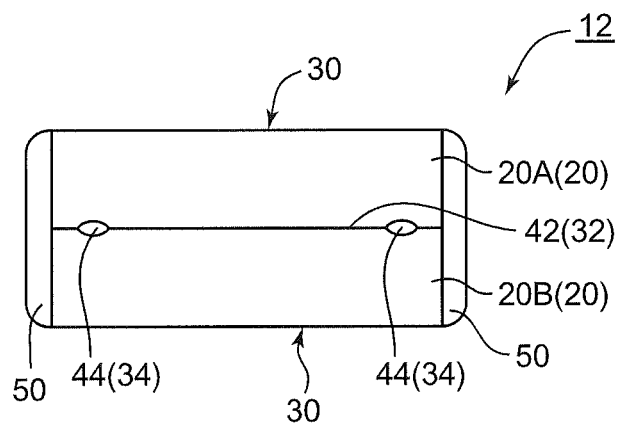
FIG. 2 A schematic cross-sectional view illustrating another example of the multilayer capacitor according to the embodiment of the present invention.

FIG. 2 is a schematic cross-sectional view illustrating another example of the multilayer capacitor according to this embodiment. In FIG. 2, the same components as those illustrated in FIG. 1 are denoted by the same reference symbols. A multilayer capacitor 12 illustrated in FIG. 2 has a structure in which the two laminated bodies 20A and 20B illustrated in the upper section of FIG. 1 are bonded together at the second surfaces 32 thereof. Accordingly, hollow portions 44 resulting from the recess portions 34 of the second surfaces 32 are formed at a bonding interface 42 between the laminated bodies 20.

Figure 3:
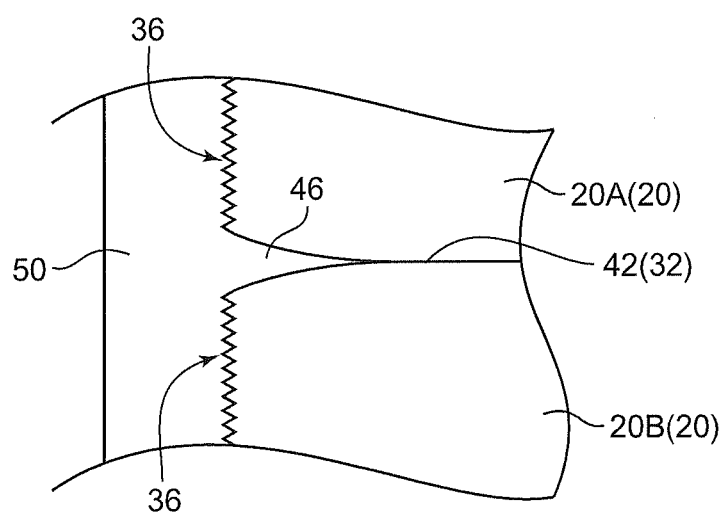
FIG. 3 An enlarged view of the vicinity of an end portion of a bonding interface of the multilayer capacitor illustrated in FIG. 2.

FIG. 3 is an enlarged view of the vicinity of an end portion of the bonding interface 42 of the multilayer capacitor 12 illustrated in FIG. 2. In FIG. 3, the same components as those illustrated in FIG. 2 are denoted by the same reference symbols. In the multilayer capacitor 12 illustrated in FIG. 2, the laminated bodies 20A and 20B are bonded together at the second surfaces 32 which are warped to be convex. Accordingly, in this bonded state, a gap 46 is easily formed between the two second surfaces 32 and 32 at the end portion of the bonding interface 42 as illustrated in FIG. 3. However, if the gap 46 is formed, a metal material constituting the external electrode 50 can be disposed in the gap 46. Further, end surfaces 36 of the laminated bodies 20 can be roughed as illustrated in FIG. 3. Accordingly, owing to the anchor effect of the roughed end surfaces 36 as well as the anchor effect of the metal material disposed in the gap 46, the external electrode 50 can be brought into close contact with the end surfaces 36 of the laminated bodies 20 more rigidly.

Figure 4:
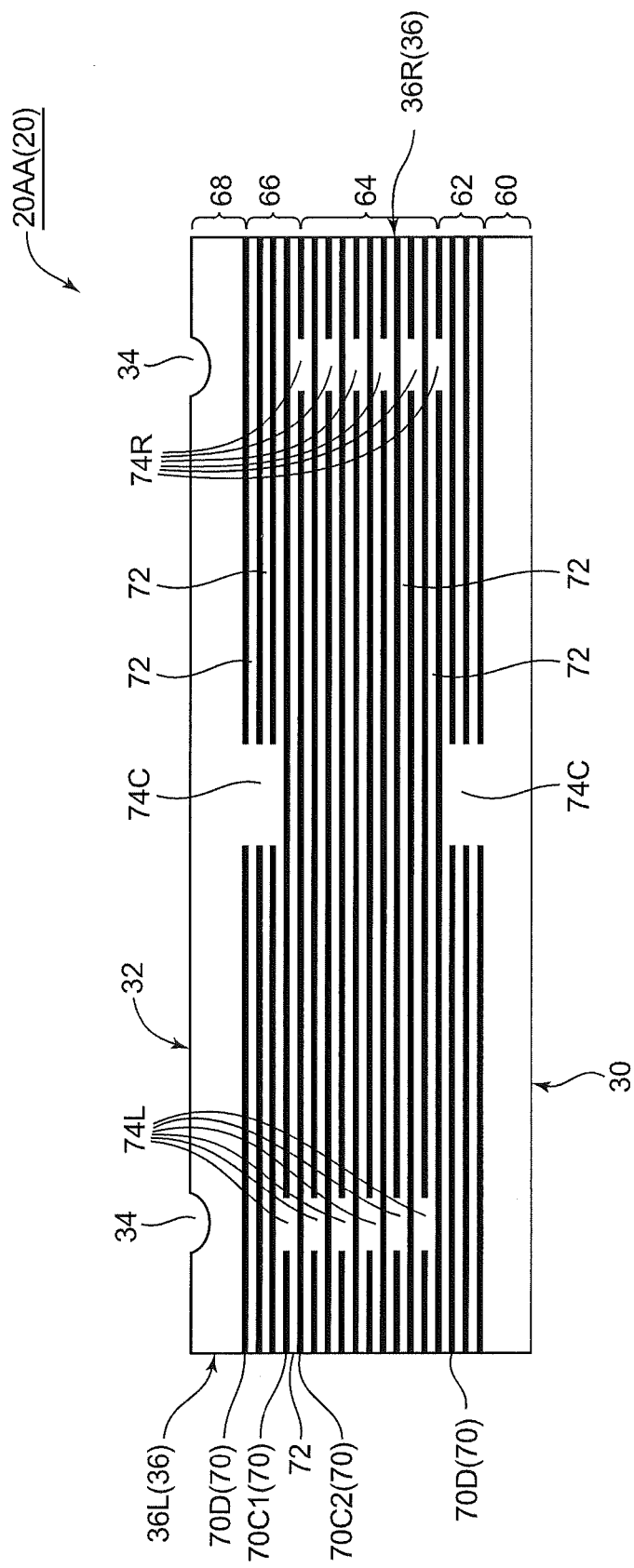
FIG. 4 A schematic cross-sectional view illustrating an example of a laminated body constituting the multilayer capacitor according to the embodiment of the present invention.

Next, a specific structure of the individual laminated bodies constituting the multilayer capacitors 10 and 12 is described. FIG. 4 is a schematic cross-sectional view illustrating an example of the laminated body constituting the multilayer capacitor according to this embodiment, specifically illustrating a layer structure inside the laminated body. Note that, the laminated body illustrated in FIG. 4 is a single body before bonding, and, although the laminated body is naturally warped, the laminated body is illustrated without warpage for the sake of simple description of the layer structure inside the laminated body.

A laminated body 20AA illustrated in FIG. 4 is an example of the laminated body 20A or the laminated body 20B illustrated in FIG. 1. The laminated body 20AA has a layer structure in which a first surface layer 60, a first dummy layer 62, a capacitor layer 64, a second dummy layer 66, and a second surface layer 68 are laminated in the stated order from the first surface 30 side to the second surface 32 side. The layer structure is substantially symmetric about the thickness direction. Note that, for the sake of description, FIG. 4 illustrates the capacitor layer 64 as a portion having a thickness of a little over about ⅓ of the total thickness of the laminated body 20AA. In general, however, the capacitor layer 64 is a portion having substantially the same thickness as the total thickness of the laminated body 20AA in order to maximize the capacitance. In FIG. 4, a black color portion is made of a metal material and a white color portion is made of a resin material. In the manufacture of the multilayer capacitor 10 or 12 with the use of the laminated body 20AA, the external electrodes 50 (not shown in FIG. 4) are provided to be in contact with a right end surface 36R and a left end surface 36L of the laminated body 20AA, respectively.

The first dummy layer 62, the capacitor layer 64, and the second dummy layer 66 each have a structure in which a plurality of metal layers 70 (black striped lines in the figure) and a plurality of resin layers 72 (white striped lines sandwiched between two black striped lines in the figure) are laminated alternately in the thickness direction of the laminated body 20AA.

Then, respective metal layers 70D constituting the first dummy layer 62 and the second dummy layer 66 are disconnected at a center portion of the laminated body 20AA in the longitudinal direction (lateral direction of FIG. 4) so as to interrupt electrical conduction in the direction from the right end surface 36R side to the left end surface 36L side or in the opposite direction. Hereinafter, the region in which the metal layers 70D are partially disconnected is referred to as conduction interrupted region 74C. Thus, for example, even if the right end surface 36R side of the laminated body 20AA is set as a positive electrode and the left end surface 36L side is set as a negative electrode, the resin layers 72 positioned to the right of the conduction interrupted region 74C are positioned between two metal layers 70D functioning as the positive electrode, and the resin layers 72 positioned to the left of the conduction interrupted region 74C are positioned between two metal layers 70D functioning as the negative electrode. Therefore, the first dummy layer 62 and the second dummy layer 66 do not function as a capacitor.

Note that, the conduction interrupted region 74C is formed by patterning processing performed at substantially the same time as the film formation of the metal layers 70 or before and after the film formation. The dummy layers 62 and 66 may be omitted because the dummy layers 62 and 66 do not function as a capacitor, but the dummy layers 62 and 66 may be provided depending on manufacturing convenience or the like in the manufacture of the laminated body 20AA. For example, the major process in the manufacture of the laminated body 20AA is mainly a film formation process for laminating the metal layers 70 and the resin layers 72 alternately and continuously. Immediately after the start or immediately before the end of the film formation process, the film formation condition tends to deviate from the steady state suitable for the film formation of the capacitor layer 64. Therefore, in that period, the dummy layers 62 and 66 can be formed instead of the capacitor layer 64. Note that, the dummy layers 62 and 66 may have a function of reinforcing the capacitor layer 64 by protecting the capacitor layer 64 from an externally applied mechanical force.

On the other hand, the capacitor layer 64 also has a structure in which, similarly to the two dummy layers 62 and 66, a plurality of metal layers 70 and a plurality of resin layers 72 are laminated alternately in the thickness direction of the laminated body 20AA. In the capacitor layer 64, however, the metal layers 70 are disconnected at different positions from those in the dummy layers 62 and 66. In other words, one metal layer 70C1 of two metal layers 70C1 and 70C2 provided so as to sandwich the resin layer 72 is partially disconnected by a conduction interrupted region 74L which is provided closer to the left end surface 36L in the longitudinal direction of the laminated body 20AA, and the other metal layer 70C2 is partially disconnected by a conduction interrupted region 74R which is provided closer to the right end surface 36R in the longitudinal direction of the laminated body 20AA. The same configuration applies to the other metal layers 70 constituting the capacitor layer 64. In other words, specifically, when the metal layers 70 constituting the capacitor layer 64 are numbered sequentially from the first surface 30 side to the second surface 32 side, the capacitor layer 64 has a layer structure in which the 2a-th (or (2a−1)th) metal layer 70 is disconnected by the conduction interrupted region 74R and the (2a−1)th (or 2a-th) metal layer 70 is disconnected by the conduction interrupted region 74L. In this case, "a" is an integer of 1 or more.

Accordingly, for example, when the right end surface 36R side of the laminated body 20AA is set as a positive electrode and the left end surface 36L side is set as a negative electrode, the resin layers 72 which are positioned between the conduction interrupted region 74R and the conduction interrupted region 74L in the longitudinal direction of the laminated body 20AA and constitute the capacitor layer 64 are positioned between two metal layers 70 disposed to sandwich the resin layers 72, namely dielectric layers, one of which functions as the positive electrode and the other functions as the negative electrode. Therefore, the capacitor layer 64 functions as a capacitor.

Note that, the conduction interrupted regions 74R and 74L are each disposed at the same position in the longitudinal direction of the laminated body 20AA. As described above, the capacitor layer 64 is substantively a region that occupies the majority of the laminated body 20AA in the thickness direction thereof, and hence a large number of the conduction interrupted regions 74R (74L) are disposed to overlap one another in the thickness direction of the laminated body 20AA. Similarly to the conduction interrupted region 74C, the conduction interrupted regions 74R and 74L are formed by patterning processing performed at substantially the same time as the film formation of the metal layers 70 or before and after the film formation so as to remove a part of the metal layers 70 to be originally formed. Accordingly, in the manufacture of a laminated body by laminating the first surface layer 60, the first dummy layer 62, the capacitor layer 64, the second dummy layer 66, and the second surface layer 68 on a support body in the stated order, the recess portion 34 is formed in the second surface 32 corresponding to the portion at which the plurality of conduction interrupted regions 74R (74L) are disposed to overlap one another in the thickness direction of the laminated body 20AA.

The arrangement patterns of the conduction interrupted regions 74R and 74L as well as the numbers of the conduction interrupted regions 74R and 74L in the longitudinal direction of the laminated body 20AA are not limited to the example illustrated in FIG. 4 as long as the respective conduction interrupted regions 74R and 74L can be disposed to overlap one another in the thickness direction of the laminated body 20AA to thereby form the recess portions 34 and as long as the capacitor layer 64 can exert the function as a capacitor. For example, the conduction interrupted regions 74R (74L) may be provided in contact with the right end surface 36R (36L), instead of being provided at a slight distance from the right end surface 36R (36L) as illustrated in FIG. 4.

The first surface layer 60 and the second surface layer 68 have substantially the same thickness which is large enough to ensure the function as protective layers after the assembly of the multilayer capacitor. Accordingly, the laminated body 20AA illustrated in FIG. 4 can be used not only for the manufacture of the multilayer capacitors 10 and 12 of this embodiment as exemplified in FIGS. 1 and 2 but also for the manufacture of a conventional single type multilayer capacitor with the use of the laminated body 20AA alone. Those surface layers 60 and 68 need to contain a resin material but are generally preferred to be formed of a resin material alone.

Figure 5:
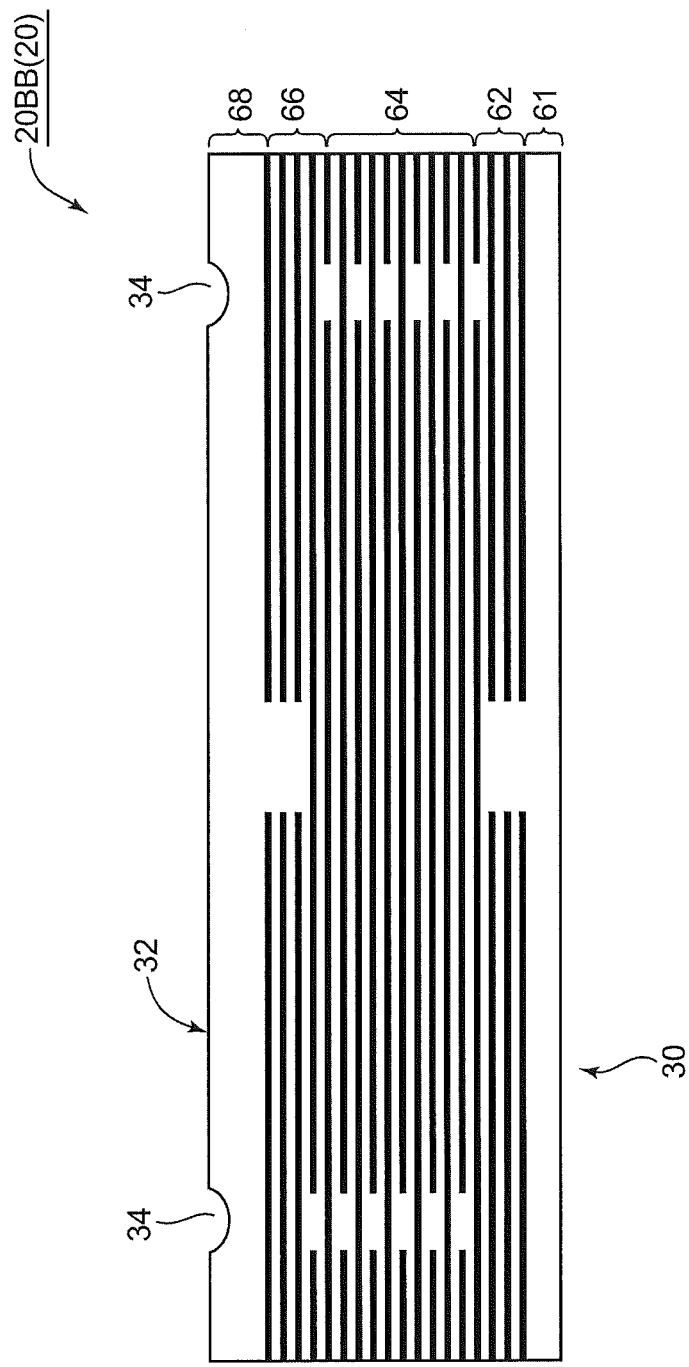
FIG. 5 A schematic cross-sectional view illustrating another example of the laminated body constituting the multilayer capacitor according to the embodiment of the present invention.

FIG. 5 is a schematic cross-sectional view illustrating another example of the laminated body constituting the multilayer capacitor according to this embodiment, specifically illustrating a modified example of the laminated body 20AA illustrated in FIG. 4. Note that, the laminated body illustrated in FIG. 5 is a single body before bonding, and, although the laminated body is naturally warped, the laminated body is illustrated without warpage for the sake of simple description of the layer structure inside the laminated body. In FIG. 5, the same components as those of the laminated body 20AA illustrated in FIG. 4 are denoted by the same reference symbols.

A laminated body 20BB illustrated in FIG. 5 has basically the same layer structure as that of the laminated body 20AA illustrated in FIG. 4, but is different in that the thickness of only a first surface layer 61 illustrated in FIG. 5 is smaller than the thickness of the first surface layer 60 of the laminated body 20AA illustrated in FIG. 4 and that the layer structure in the thickness direction is asymmetric. The thickness of the first surface layer 61 is set to such a thickness that the function as a protective layer cannot be ensured after the assembly of the multilayer capacitor. Therefore, in the manufacture of the multilayer capacitors 10 and 12 of this embodiment exemplified in FIGS. 1 and 2 with the use of the laminated body 20BB, it is necessary to bond the laminated bodies 20BB together at the first surfaces 30 thereof. However, the use of the laminated body 20BB illustrated in FIG. 5 for the manufacture of the multilayer capacitors 10 and 12 of this embodiment exemplified in FIGS. 1 and 2 can reduce the thickness more while ensuring the same capacitance than the case where the laminated body 20AA illustrated in FIG. 4 is used.

The laminated bodies 20 used for the multilayer capacitors 10 and 12 of this embodiment are warped. The warpage occurs in the case (1) where the laminated body 20 is formed on a curved surface of a curved support body or in the case (2) where a laminated body whose layer structure in the thickness direction is asymmetric in terms of structure and/or material is formed on a flat surface of a flat support body. Examples of the case (1) include the formation of the laminated body 20 on the outer circumferential surface of a columnar support body and the formation of the laminated body 20 on the inner circumferential surface of a cylindrical support body. An example of the case (2) includes the laminated body 20BB exemplified in FIG. 5 whose layer structure in the thickness direction is asymmetric in terms of structure. The case (2) also applies to a laminated body whose layer structure in the thickness direction is asymmetric in terms of material, such as the laminated body 20AA exemplified in FIG. 4 whose layer structure in the thickness direction is symmetric in terms of structure if the first surface layer 60 and the second surface layer 68 are made of different kinds of materials having different coefficients of thermal expansion, for example.

Next, the constituent materials of the respective layers and the external electrode 50 constituting the multilayer capacitors 10 and 12 of this embodiment and the formation method therefor are described in more detail. First, as for the material constituting the metal layer 70, any publicly-known material having conductivity can be used. Examples thereof include Al, Zn, Cu, Ag, Ni, and an alloy thereof, and, of those, Al is particularly preferred. As for the method of forming the metal layer 70, any publicly-known vapor phase film formation method capable of performing a step of depositing a metal raw material, such as a deposition method, a sputtering method, and a CVD method, can be used. Note that, in the formation of the metal layer 70, in order to provide the conduction interrupted regions 74R and 74L and the like, patterning processing is performed at substantially the same time as the film formation of the metal layers 70 or before and after the film formation. As for the patterning processing, a publicly-known patterning method can be used and performed. Available examples of the method include a method of performing deposition after subjecting a part of the surface to be provided with a metal material to oil masking of selectively applying oil such as fluorinated oil and a method of performing, after the metal layer 70 is formed into a solid film, selective etching of a part of the solid metal layer 70 by electron beams or the like. The thickness of the metal layer 70 is not particularly limited but is preferably within the range of from 10 nm to 40 nm from the viewpoint of suppressing thickness unevenness and film formation failure of the metal layer 70 and maximizing the capacitance of the multilayer capacitors 10 and 12.

As for the material constituting the resin layer 72, any publicly-known resin material that functions as a dielectric can be used. An acrylic resin and a vinyl-based resin can be exemplified, but, of those, an acrylic resin is particularly preferred. Examples of the resin material to be appropriately used include a resin material which is curable through at least one kind of physical stimuli selected from heat and light such as radiation and ultraviolet rays, a resin material which is curable with the use of an additive such as a polymerization initiator and a cross-linking promoter, and a resin material which is curable by both a physical stimulus and an additive in combination. As for the method of forming the resin layer 72, any publicly-known vapor phase film formation method capable of performing a step of depositing a resin raw material, such as a deposition method, can be used. In the case where a polymerizable monomer is used as a resin raw material, the polymerizable monomer is given at least a physical stimulus after being placed on a support body and is cured. The thickness of the resin layer 72 is not particularly limited but is preferably within the range of from 100 nm to 1,000 nm from the viewpoint of suppressing thickness unevenness and film formation failure of the resin layer 72 and maximizing the capacitance of the multilayer capacitors 10 and 12.

Note that, although depending on the specifications of the multilayer capacitors 10 and 12 to be manufactured, the sum of the number of the metal layers 70 and the number of the resin layers 72 (total number of laminations) in the laminated body 20 is preferably 10,000 or less, which is half or less of the total number of laminations in a typical conventional single type multilayer capacitor, more preferably 8,000 or less. When the total number of laminations is 10,000 or less, as compared with a conventional single type multilayer capacitor having a similar capacitance, the occurrence of foreign matters and defects or the like can be suppressed to improve the yields more, and also, it becomes easier to further suppress the fluctuations in quality such as the capacitance property. Note that, the lower limit of the total number of laminations is not particularly limited but is preferably 500 or more from the practical viewpoint.

The material constituting the surface layers 60, 61, and 68 is not particularly limited as long as the material contains a publicly-known resin material, and may contain other components such as an inorganic filler for the purpose of improvement of the mechanical strength or the like. However, it is basically preferred to use only a resin material as the material constituting the surface layers 60, 61, and 68. The same resin material as that of the resin layer 72 may be used, or a different resin material may be used. Further, as for the formation method for the surface layers 60, 61, and 68, the same formation method as that for the resin layer 72 may be used, or a different formation method may be used. However, from the viewpoint of productivity, it is preferred to use the same resin material and the same formation method for the surface layers 60, 61, and 68 and the resin layer 72. The thickness of the surface layers 60 and 68 is preferably set within the range from about 5 µm to about 500 µm in order to protect the inside of the laminated body 20 from abrasion and heating at the time of mounting after the multilayer capacitors 10 and 12 are manufactured. The thickness of the surface layer 61 to be formed on the bonding interface 40 or 42 side in the manufacture of the multilayer capacitor 10 or 12 is preferably set within the range of from about 0.1 µm to 5 µm in consideration of the fact that the surface layer 61 is not required to function as a protective layer as opposed to that required for the surface layers 60 and 68.

Note that, the degree of cure of the resin material constituting the surface layers 60, 61, and 68 may be similar to that of the resin layer 72, but, in the case where the surface layers 60, 61, and 68 are positioned on the bonding surface side in the multilayer capacitors 10 and 12, the degree of cure of the resin material at the time of forming the surface layers 60, 61, and 68 may be set to be lower. The reason is that, in this case, the stickiness and the fluidity of the surface layers 60, 61, and 68 become higher and hence the adhesiveness at the bonding interfaces 40 and 42 can be enhanced more in the bonding between the laminated bodies 20. Therefore, from the viewpoint of enhancing the adhesiveness at the bonding interfaces 40 and 42 more, the degree of cure of the resin material constituting the surface layers 60, 61, and 68 to be positioned on the bonding interface 40 or 42 side is preferably less than 90%, more preferably 75% or less, still more preferably 60% or less. Note that, the lower limit of the degree of cure after curing is not particularly limited but is preferably 40% or more from the viewpoint of preventing the surface layers 60, 61, and 68 from losing their shapes.

Note that, the degree of cure can be determined by infrared absorption spectroscopy of the resin material before and after curing. In this case, the absorption peak for determining the degree of cure is selected from among a plurality of absorption peaks observed before and after curing as an absorption peak whose peak itself is not observed (intensity is zero) or whose intensity is very weak before curing but is strong after curing is performed until polymerization reaction is almost completed or an absorption peak whose intensity is strong after curing is performed until polymerization reaction is almost completed and whose peak itself is not observed (intensity is zero) or whose intensity is very weak before curing. Note that, which partial structure in the resin material an absorption peak results from can be selected as appropriate depending on molecular structure of the resin material. Basically, among absorption peaks which increase or attenuate with the progress of polymerization reaction, an absorption peak having the largest change in intensity before and after curing is selected. Then, the degree of cure can be determined in a manner that the intensity before curing corresponds to a degree of cure of 0% and the intensity after sufficient curing corresponds to a degree of cure of 100%.

Through an appropriate combination of the material, the film formation method, and the like described above, the respective layers are sequentially laminated on the support body to manufacture the laminated body 20. Note that, the laminated body 20 formed on the support body as used herein does not mean a single laminated body as exemplified in FIG. 4 or 5 having the size corresponding to one multilayer capacitor 10 or 12 but means a laminated body which has a laterally continuous structure in the planar direction of the laminated body 20 (XY direction of the perspective view in the lower section of FIG. 1) so that a large number of single laminated bodies are obtained by cutting. As for the support body as used herein, a columnar support body, a cylindrical support body, a flat support body, and other similar support bodies can be used as appropriate as long as the support body has a smooth (flat) surface on which the laminated body 20 is to be formed. As for the surface on which the laminated body is to be formed, the outer circumferential surface is selected for the columnar support body, the outer circumferential surface or the inner circumferential surface is selected for the cylindrical support body, and the flat surface is selected for the flat support body. Note that, when the flat support body is used, the layer structure in the thickness direction is asymmetric so as to generate warpage in the laminated body 20.

As described above, in the manufacture of the laminated body 20, various combinations of the support bodies and the film formation method for the respective layers can be used. In consideration of practicality such as mass productivity, it is preferred to manufacture the laminated body 20 through the process described below. That is, the laminated body 20 in which the first surface layer 60 or 61, the capacitor layer 64, and the second surface layer 68 are laminated in the stated order can be obtained through at least a first surface layer forming step of forming, by a vapor phase film formation method, the first surface layer 60 or 61 made of a resin material on the outer circumferential surface of a columnar member rotating in one direction, a capacitor layer forming step of forming, on the first surface layer 60 or 61, the capacitor layer 64 which has a structure in which the metal layers 70 and the resin layers 72 are alternately laminated a plurality of times and functions as a capacitor, and a second surface layer forming step of forming, by a vapor phase film formation method, the second surface layer 68 made of a resin material on the metal layer 70 formed lastly in the formation of the capacitor layer 64. Note that, in an initial stage or a terminal stage of the capacitor layer forming step, the film formation conditions are transient and the film thickness and film quality are apt to fluctuate more. Therefore, in this period, the dummy layers 62 and 66 may be formed. In this case, the laminated body 20 illustrated in FIG. 4 or 5 can be obtained. The first surface layer forming step, the capacitor layer forming step, and the second surface layer forming step described above are preferred to be performed in one vacuum container and be all performed by a deposition method from the viewpoints of practicality and mass productivity.

Note that, in the capacitor layer forming step, after the first surface layer forming step is finished, the following four steps are repeatedly and sequentially performing in this order a plurality of times:

(1) a first formation step of forming, by a vapor phase film formation method, the metal layer 70 (such as the metal layer 70C2 of FIG. 4) which is patterned and actually functions as an electrode of any one of a positive polarity and a negative polarity;

(2) a second formation step of forming, by a vapor phase film formation method, the resin layer 72 on the metal layer 70 formed in the first formation step;

(3) a third formation step of forming, by a vapor phase film formation method, the metal layer 70 (such as the metal layer 70C1 of FIG. 4) which is patterned and actually functions as an electrode of an opposite polarity to the one of the positive polarity and the negative polarity; and (4) a fourth formation step of forming, by a vapor phase film formation method, the resin layer 72 on the metal layer 70 formed in the third formation step.

Then, the first formation step or the third formation step is performed as a final formation step for terminating the repetition from the first formation step to the fourth formation step, to thereby complete the capacitor layer forming step. In this case, it is the metal layer 70 that is formed lastly in the capacitor layer forming step. Note that, in the patterning, a part of the surface of the first surface layer 60 or 61 or the resin layer 72 is subjected to oil masking of applying fluorinated oil, and then the metal layer 70 is formed by a deposition method. In this case, the application position of oil is selected so as to correspond to the region in which the conduction interrupted regions 74R and 74L are to be formed. Note that, in an initial stage or immediately before the capacitor layer forming step, oil may be applied so as to correspond to the region in which the conduction interrupted region 74C is to be formed, to thereby form the dummy layers 62 and 66.

After the surface layer 60, 61, or 68 or the resin layer 72 is formed, and before the next layer is formed thereon or a subsequent step is performed, curing processing of curing the resin material may be performed depending on the type of the resin material to be used. For example, in the case where the surface layers 60, 61, and 68 and the resin layer 72 are radiation-curable resins to be cured by electron beams, after those layers are formed, electron beams may be applied before the next layer is formed or the subsequent step is performed.

Figure 6:
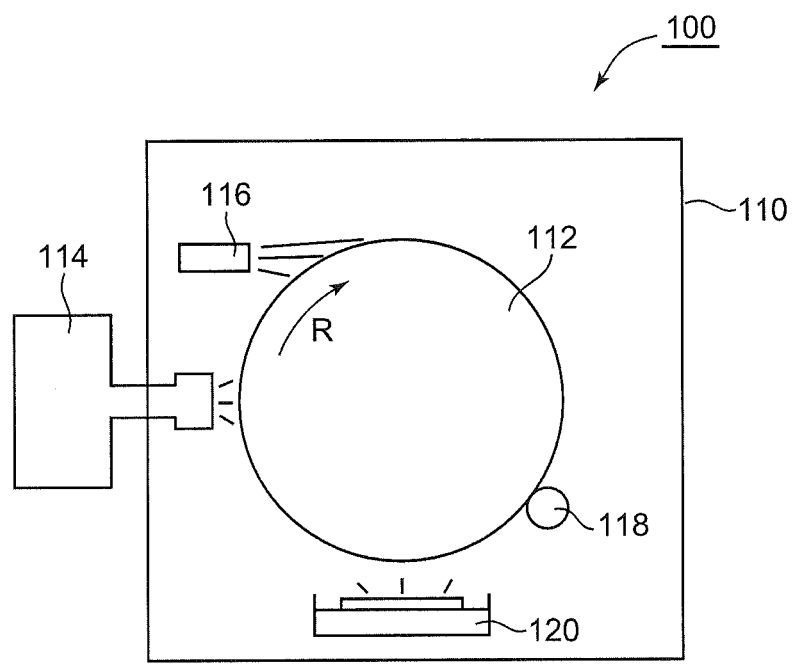
FIG. 6 A schematic diagram illustrating an example of a film formation apparatus used in the manufacture of a laminated body.

FIG. 6 is a schematic diagram illustrating an example of a film formation apparatus used for the manufacture of the laminated body 20, specifically illustrating an apparatus capable of continuously performing the first surface layer forming step, the capacitor layer forming step, and the second surface layer forming step described above. A film formation apparatus 100 illustrated in FIG. 6 includes a vacuum container 110 and a rotary drum (columnar member) 112 which is disposed inside the vacuum container 110 and is rotatable in the clockwise direction (the direction of arrow R) in the figure. On the periphery of the rotary drum 112, resin raw material supply means 114 for depositing a resin raw material (polymerizable monomer) of a type that is cured by electron beams on the outer circumferential surface of the rotary drum 112, electron beam irradiation means 116 for irradiating the outer circumferential surface of the rotary drum 112 with electron beams, patterning means 118 for applying oil selectively at a predetermined position on the outer circumferential surface of the rotary drum 112, and metal deposition means 120 for depositing a metal material on the outer circumferential surface of the rotary drum 112 are disposed along the rotation direction R.

In the manufacture of the laminated body 20, a vacuum pump (not shown) connected to the vacuum container 110 is used to reduce the pressure in the vacuum container 110 to a pressure suitable for deposition of the polymerizable monomer and the metal material. The pressure on this occasion is, for example, about $2 \times 10^{-2}$ Pa to $1 \times 10^{-2}$ Pa. Next, the rotary drum 112 is rotated, and the polymerizable monomer in the resin raw material supply means 114 is vaporized to be deposited on the rotary drum 112. Subsequently, a thin film made of the polymerizable monomer on the rotary drum 112 is irradiated with electron beams by the electron beam irradiation means 116, thereby curing the film. The deposition of the polymerizable monomer and the irradiation of electron beams are repeated alternately to form first surface layers 60 and 61 having a predetermined thickness (first surface layer forming step).

Subsequently, in addition to the deposition of the polymerizable monomer and the irradiation of electron beams, the oil application by the patterning means 118 and the deposition of the metal material by the metal deposition means 120 are performed. In this way, every time the rotary drum 112 rotates one revolution, one resin layer 72 and one patterned metal layer 70 are laminated on the outer circumferential surface of the rotary drum 112 in the stated order. Then, through the repetition of the processes of alternately laminating the resin layer 72 and the metal layer 70, the capacitor layer 64 is formed to have a predetermined thickness (capacitor layer forming step). Note that, in an initial stage or a terminal stage of the capacitor layer forming step, where the operating state of the film formation apparatus 100 is apt to be transient, the patterning positions of oil are changed to form the dummy layers 62 and 66. Finally, again, the deposition of a polymerizable monomer and the irradiation of electron beams are alternately repeated to form the second surface layer 68 having a predetermined thickness (second surface layer forming step). In this manner, the laminated body 20 having a layer structure as exemplified in FIG. 4 or 5 can be obtained.

With the use of the film formation apparatus 100 as exemplified in FIG. 6 and the like, the laminated body 20 formed on the support body is subjected to a releasing step of releasing the laminated body 20 from the support body, a cutting step of cutting the laminated body 20 into two or more pieces, and a bonding step of bonding the first surfaces 30 or the second surfaces 32 of the laminated bodies 20 (or bonding the first surface layers 60 and 61 or the second surface layers 68) together. Note that, the order of the steps may be changed as appropriate.

It is preferred that the cutting step be performed in separate steps, namely a first cutting step of cutting the laminated body 20 into a card size (for example, several centimeters to more than ten centimeters in length and width) and a second cutting step of cutting, after the card-size laminated bodies 20 are bonded together, the bonded laminated bodies into a bar or stripe size. The bonding step can be performed with the use of the laminated body 20 selected from any one of the large-size laminated body 20 after the releasing step, the card-size laminated body 20 after the first cutting step, the stripe-size laminated body 20 after the second cutting step, and the unit element 20 after the third cutting step. However, in consideration of bonding workability, production efficiency, and the like, it is preferred to use the card-size laminated body 20 in the bonding step. Note that, the large-size or card-size laminated body 20 means a state in which the single laminated body 20 illustrated in FIG. 4 or 5 is continuous in the vertical and lateral directions of the sheet of the figure, and the unit element laminated body 20 means a state in which the single laminated body 20 illustrated in FIG. 4 or 5 is continuous in the vertical direction of the sheet of the figure.

The bonding step is performed by a hot pressing after the laminated bodies 20 stacked together at the first surfaces 30 or the second surfaces 32 are placed between two flat members. The hot pressing can be performed within the range of from about 50° C. to about 300° C. for heating temperature, within the range of from about 0.1 kgf/cm² to about 3 kgf/cm² for press pressure, and within the range of from about 0.5 hours to about 10 hours. The hot pressing may be performed in a normal atmosphere or may be performed under a reduced-pressure environment of 500 Pa or less in order to suppress the residue of air at the bonding interface 40 or 42.

Note that, in the manufacture of a conventional multilayer capacitor, regardless of whether the multilayer capacitor is of single type or bonded type, in order to correct the warpage of the laminated body 20, it is necessary to subject the laminated body 20 to a flattening step in which hot pressing is performed to flatten the laminated body 20. However, in the manufacture of the multilayer capacitor 10 or 12 of this embodiment, a hot pressing is used to perform the bonding step, to thereby eliminate the warpage in the laminated body 20. In other words, the flattening step performed in the manufacture of a conventional multilayer capacitor is substantively replaced with the bonding step in the manufacture of the multilayer capacitor 10 or 12 of this embodiment. Accordingly, the number of steps in the manufacture of the multilayer capacitor 10 or 12 of this embodiment is not increased as compared with the conventional one, and hence the productivity is not lowered.

The warpage amount of the laminated body 20 basically tends to be proportional to the thickness thereof to some extent. Accordingly, for example, when the multilayer capacitor 10 or 12 of this embodiment manufactured with the use of two laminated bodies 20 and a single type multilayer capacitor manufactured with the use of one laminated body 20 are compared, the warpage amount of the laminated body 20 used for the latter single type multilayer capacitor is larger. Thus, as the thickness of the laminated body 20 becomes larger, it becomes more difficult to perform the hot pressing (flattening step) and the breakage of the laminated body 20 such as cracks more easily occurs in the hot pressing (flattening step). However, in the manufacture of the multilayer capacitor 10 or 12 of this embodiment, the laminated body 20 having a relatively smaller warpage amount can be used, and hence, even if the hot pressing (bonding step) is performed under similar conditions, the breakage of the laminated body 20 less occurs. In addition, not only two but also three or more laminated bodies 20 having a smaller warpage amount can be used, and hence a large capacitance multilayer capacitor which cannot be realized with a conventional single type multilayer capacitor can be manufactured as well.

After the bonding step, an electrode extracting step is particularly preferably performed so that, when the external electrode 50 is provided on the end surface 36 of the laminated body 20, electrical conduction between the external electrode 50 and the metal layer 70 may be reliably ensured. In the electrode extracting step, the end surface 36 is subjected to, for example, oxygen plasma processing, to thereby selectively remove only the resin layer 72 in the vicinity of the end surface 36. This processing roughens the end surface 36 and therefore, when the external electrode 50 is formed on the end surface 36, the anchor effect of closely fixing the external electrode 50 onto the end surface 36 more strongly can be obtained.

Subsequently, the end surface 36 of the laminated body 20 after at least the bonding step is performed is subjected to an external electrode forming step of forming the external electrode 50. Note that, in this stage, the unit element laminated body 20 after the second cutting step is used as the laminated body 20. In the external electrode forming step, a metal material is formed so as to cover the entire surface of the end surface 36 by a publicly-known metal film formation method such as plating, metal thermal spraying (so-called metallikon), and sputtering, or alternatively, conductive paste is applied onto the end surface 36. As necessary, two or more kinds of methods may be used in combination. For example, the external electrode 50 can be manufactured in a manner that, after a molten metal is thermally sprayed onto the end surface 36 to form a metallikon layer, conductive paste is applied onto the metallikon layer to form a conductive paste layer, and further, plating processing is performed on the conductive paste layer to form a plated layer.

The external electrode 50 may have a multilayer structure including two or more layers as exemplified above, and may have a single layer structure. As the material constituting the external electrode 50, publicly-known conductive paste or a publicly-known metal material can be used. An example of the conductive paste includes conductive paste containing Ag or carbon as a filler. Examples of the metal material include Cu, Ag, and Sn and various alloys such as brass.

The multilayer capacitors 10 and 12 according to this embodiment described above can each be used as a capacitor for a circuit board including at least one capacitor. The multilayer capacitors 10 and 12 according to this embodiment can each be used also as a capacitor for an electronic device including at least one capacitor. In this case, the electronic device may employ a circuit board including the multilayer capacitor 10 or 12 according to this embodiment. Such electronic device is not particularly limited as long as the electronic device is a publicly-known electronic device using a capacitor. Examples thereof include various kinds of office automation equipment, such as a copying machine, various communication devices such as a mobile phone, various display devices such as a liquid crystal display, a computer, and an illumination device.

EXAMPLES

Hereinafter, the present invention is described in more detail by means of examples. However, the present invention is not limited to the following examples.

Example 1

Manufacture of Laminated Body

With the use of the film formation apparatus 100 illustrated in FIG. 6, a laminated body 20AA having the layer structure illustrated in FIG. 4 was manufactured by the following procedure. First, after the pressure in the vacuum container 110 was reduced to $1.33 \times 10^{-3}$ Pa, the rotary drum 112 having a diameter of 1 m and a width of 65 cm was rotated at a rate of 100 m/min. In this state, a resin raw material (1,6-hexanediol diacrylate) was deposited on the rotary drum 112 from the resin raw material supply means 114 to form a thin film made of a polymerizable monomer. Subsequently, electron beams were applied from the electron beam irradiation means 116 at 10 kV and 100 mA, to thereby cure the thin film. Then, the deposition of a resin raw material and the irradiation of electron beams were alternately repeated to form the first surface layer 60 having a thickness of 2 μm.

Subsequently, in addition to the deposition of a resin raw material and the irradiation of electron beams, fluorinated oil is was applied at a predetermined position on the rotary drum 112 by the patterning means 118 to perform oil masking, and aluminum deposition was also performed by the resistance heating type metal deposition means 120 so that vaporized aluminum was formed on the rotary drum 112. Then, the deposition of a resin material, the irradiation of electron beams, the oil masking, and the aluminum deposition were repeated to alternately laminate the metal layer 70 having a thickness of 20 nm and the resin layer 72 having a thickness of 0.5 μm. In this case, the number of the metal layers 70 and the number of the resin layers 72 were each set to 2,100. Note that, of the 2,100 layers, the first 50 layers and the last 50 layers were the dummy layers 62 and 66 and the remaining layers were the capacitor layer 64.

After that, again, under the same conditions as those for the formation of the first surface layer 60, the deposition of a resin raw material and the irradiation of electron beams were alternately repeated to form the second surface layer 68 having a thickness of 50 μm. Note that, the degrees of cure of the first surface layer 60, the second surface layer 68, and the resin layer 72 were each 58%.

Next, the cylindrical laminated body 20AA formed on the rotary drum 112 was cut in the width direction to obtain a large-size, striped laminated body 20AA. Subsequently, the large-size laminated body 20AA was cut in the longitudinal direction into five pieces to obtain card-size laminated bodies 20AA. The card-size laminated body 20AA was warped so that the second surface 32 side was a convex surface. The warpage amount on this occasion was 2 mm. Note that, the warpage amount means a value obtained by placing the card-size laminated body 20AA on the flat floor and subtracting the thickness of the card-size laminated body 20AA from the maximum height of the card-size laminated body 20AA from the floor.

—Bonding—

Subsequently, on a member in which a silicone rubber sheet containing glass fiber and a glass fiber sheet were disposed on a stainless plate in the stated order, the card-size laminated bodies 20AA stacked together at the first surfaces 30 were placed, and a stainless plate was further placed thereon. The stacked members were placed in a vacuum hot pressing device and subjected to hot pressing under an argon gas substituted atmosphere of 50 Pa for 60 minutes at a temperature of 150° C. and a pressure of 1 kgf/cm$^2$, to thereby bond two card-size laminated bodies 20AA together. The bonded body obtained by bonding the thus obtained card-size laminated bodies 20AA together had a warpage amount of 0.10 mm, and it was confirmed that the warpage was eliminated substantively.

—Formation of External Electrode—

Subsequently, the card-size bonded body was cut into a bar-like unit element size and thereafter the end surfaces 36 of the laminated bodies 20AA constituting the unit element were subjected to oxygen plasma processing. Further, the end surface 36 was sequentially subjected to brass metal thermal spraying, conductive paste application, and Sn plating, to thereby form the external electrode 50. Then, the resultant was cut into the chip size, to thereby obtain a multilayer capacitor 10 with a thickness of 2.5 mm having the structure illustrated in the middle and lower sections of FIG. 1.

Example 2

A multilayer capacitor 10 with a thickness of 3.5 mm having the structure illustrated in the middle and lower sections of FIG. 1 was obtained similarly to Example 1 except that, in the manufacture of the laminated body 20AA in Example 1, the numbers of the laminated metal layers 70 and resin layers 72 constituting the capacitor layer 64 were increased. Note that, the bonded body obtained by bonding the card-size laminated bodies 20AA together had a warpage amount of 0.10 mm, and it was confirmed that the warpage was eliminated substantively.

Example 3

A multilayer capacitor 10 with a thickness of 4.5 mm having the structure illustrated in the middle and lower sections of FIG. 1 was obtained similarly to Example 1 except that, in the manufacture of the laminated body 20AA in Example 1, the numbers of the laminated metal layers 70 and resin layers 72 constituting the capacitor layer 64 were increased. Note that, the bonded body obtained by bonding the card-size laminated bodies 20AA together had a warpage amount of 0.20 mm, and it was confirmed that the warpage was eliminated substantively.

Comparative Example 1

A single type multilayer capacitor with a thickness of 2.5 mm was obtained similarly to Example 1 except that, in the manufacture of the laminated body 20AA in Example 1, the numbers of the laminated metal layers 70 and resin layers 72 constituting the capacitor layer 64 were increased and the flattening step was performed instead of performing the bonding step. Note that, the laminated body 20AA after the flattening step had a warpage amount of 0.15 mm, and it was confirmed that the warpage was eliminated substantively.

Comparative Example 2

A single type multilayer capacitor with a thickness of 3.5 mm was obtained similarly to Comparative Example 1 except that, in the manufacture of the laminated body 20AA in Comparative Example 1, the numbers of the laminated metal layers 70 and resin layers 72 constituting the capacitor layer 64 were increased. Note that, the laminated body 20AA after the flattening step had a warpage amount of 0.20 mm, and it was confirmed that the warpage was eliminated substantively.

Comparative Example 3

A single type multilayer capacitor with a thickness of 4.5 mm was obtained similarly to Comparative Example 1 except that, in the manufacture of the laminated body 20AA in Comparative Example 1, the numbers of the laminated metal layers 70 and resin layers 72 constituting the capacitor layer 64 were increased. Note that, the laminated body 20AA after the flattening step had a warpage amount of 0.20 mm, and it was confirmed that the warpage was eliminated substantively.

—Evaluation—

One thousand samples of Examples and Comparative Examples each were measured for the capacitance (µF) at 1 kHz as the electrical property, and yields were determined in a manner that a sample whose capacitance exceeded ±5% of an average value of the population of 1,000 samples was treated as a defective product. Table 1 shows the results. Note that, the "warpage amount" in Table 1 means a warpage amount of the card-size laminated body 20AA after the bonding processing or the flattening processing. The "crack" in Table 1 means the presence or absence of cracks in the card-size laminated body 20AA after the bonding processing or the flattening processing. Note that, the evaluation was performed in a manner that a cracked card-size laminated body was not processed to a sample and a corresponding number of laminated bodies if being processed to samples were treated as defective products.

TABLE 1

|  | Thickness (mm) | Warpage amount (mm) | Cracks | Yields (%) |
| --- | --- | --- | --- | --- |
| Example 1 | 2.5 | 0.10 | Absent | 98.7 |
| Example 2 | 3.5 | 0.10 | Absent | 95.3 |
| Example 3 | 4.5 | 0.20 | Absent | 92.6 |
| Comparative Example 1 | 2.5 | 0.15 | Absent | 89.1 |
| Comparative Example 2 | 3.5 | 0.20 | Present | 67.2 |
| Comparative Example 3 | 4.5 | 0.20 | Present | 36.1 |

The invention claimed is:

1. A multilayer capacitor, comprising two or more laminated bodies which are bonded together,
the two or more laminated bodies each comprising resin layers and metal layers which are alternately laminated a plurality of times in a thickness direction by alternately repeating at least a step of depositing a resin raw material on a support body and a step of depositing a metal raw material on the support body, one of two adjacent metal layers sandwiching at least one of the resin layers in the thickness direction functioning as a positive electrode, another of the two adjacent metal layers functioning as a negative electrode, the two or more laminated bodies each being warped and having front and rear surfaces covered with surface layers containing a resin material, one of the front and rear surfaces being formed of a first surface as a smooth surface having no recess portion, another of the front and rear surfaces being formed of a second surface having a recess portion, wherein at least two adjacent laminated bodies are bonded together at the first surfaces or the second surfaces.

2. A multilayer capacitor according to claim 1, wherein the multilayer capacitor has a thickness in a range of from 2 mm to 10 mm.

3. A multilayer capacitor according to claim 1, wherein two surface layers positioned on both sides of a bonding interface at which the two adjacent laminated bodies are bonded together at the first surfaces or the second surfaces have a total thickness in a range of 2 to 100 times a thickness of each of the resin layers.

4. A multilayer capacitor according to claim 1, wherein:
both end surfaces of the laminated bodies in which two or more laminated bodies are bonded and laminated together are each covered with a metal material functioning as an external electrode; and
the metal material is present also at bonding interface between the laminated bodies in a vicinity of the both end surfaces.

5. A circuit board, comprising the multilayer capacitor,
the multilayer capacitor comprising two or more laminated bodies which are bonded together,
the two or more laminated bodies each comprising resin layers and metal layers which are alternately laminated a plurality of times in a thickness direction by alternately repeating at least a step of depositing a resin raw material on a support body and a step of depositing a metal raw material on the support body,
one of two adjacent metal layers sandwiching at least one of the resin layers in the thickness direction functioning as a positive electrode, another of the two adjacent metal layers functioning as a negative electrode,
the two or more laminated bodies each being warped and having front and rear surfaces covered with surface layers containing a resin material, one of the front and rear surfaces being formed of a first surface as a smooth surface having no recess portion, another of the front and rear surfaces being formed of a second surface having a recess portion,
wherein at least two adjacent laminated bodies are bonded together at the first surfaces or the second surfaces.

6. An electronic device, comprising the multilayer capacitor,
the multilayer capacitor comprising two or more laminated bodies which are bonded together,
the two or more laminated bodies each comprising resin layers and metal layers which are alternately laminated a plurality of times in a thickness direction by alternately repeating at least a step of depositing a resin raw material on a support body and a step of depositing a metal raw material on the support body,
one of two adjacent metal layers sandwiching at least one of the resin layers in the thickness direction functioning as a positive electrode, another of the two adjacent metal layers functioning as a negative electrode,
the two or more laminated bodies each being warped and having front and rear surfaces covered with surface layers containing a resin material, one of the front and rear surfaces being formed of a first surface as a smooth surface having no recess portion, another of the front and rear surfaces being formed of a second surface having a recess portion,
wherein at least two adjacent laminated bodies are bonded together at the first surfaces or the second surfaces.

7. A method of manufacturing a multilayer capacitor, comprising:
forming a laminated body in which a first surface layer, a capacitor layer, and a second surface layer are laminated in the stated order,
the forming a laminated body comprising at least:
a first surface layer forming step of forming, by a vapor phase film formation method, the first surface layer made of a resin material on an outer circumferential surface of a columnar member rotating in one direction;
a capacitor layer forming step of forming, on the first surface layer, the capacitor layer which has a structure in which metal layers and resin layers are alternately laminated a plurality of times and functions as a multilayer capacitor,
the capacitor layer forming step comprising:
after the first surface layer forming step is finished, repeatedly and sequentially performing in this order a plurality of times:
(1) a first formation step of forming, by a vapor phase film formation method, a metal layer which is patterned and actually functions as an electrode of any one of a positive polarity and a negative polarity;
(2) a second formation step of forming, by a vapor phase film formation method, a resin layer on the metal layer formed in the first formation step;
(3) a third formation step of forming, by a vapor phase film formation method, a metal layer which is patterned and actually functions as an electrode of an opposite polarity to the one of the positive polarity and the negative polarity; and
(4) a fourth formation step of forming, by a vapor phase film formation method, a resin layer on the metal layer formed in the third formation step; and
performing the first formation step or the third formation step as a final formation step for terminating the repetition from the first formation step to the fourth formation step; and
a second surface layer forming step of forming, by a vapor phase film formation method, the second surface layer made of a resin material on the metal layer formed lastly in the forming the capacitor layer; and
at least a bonding step of bonding, after the laminated body is released from the outer circumferential surface of the columnar member and is cut into two or more pieces, the cut laminated bodies together at the first surface layers or the second surface layers.

* * * * *